(12) United States Patent
Piesinger

(10) Patent No.: US 8,570,211 B1
(45) Date of Patent: Oct. 29, 2013

(54) AIRCRAFT BIRD STRIKE AVOIDANCE METHOD AND APPARATUS

(76) Inventor: Gregory Hubert Piesinger, Cave Creek, AZ (US)

( * ) Notice: Subject to any disclaimer, the term of this patent is extended or adjusted under 35 U.S.C. 154(b) by 472 days.

(21) Appl. No.: 12/657,318

(22) Filed: Jan. 19, 2010

Related U.S. Application Data

(60) Provisional application No. 61/205,697, filed on Jan. 22, 2009.

(51) Int. Cl.
*G01S 13/00* (2006.01)
(52) U.S. Cl.
USPC ............................................................ 342/29
(58) Field of Classification Search
USPC ................................................... 342/29–32
See application file for complete search history.

(56) References Cited

U.S. PATENT DOCUMENTS

| | | | | | |
|---|---|---|---|---|---|
| 2,713,161 | A | * | 7/1955 | Fiske ............................. | 342/371 |
| 3,005,194 | A | * | 10/1961 | Goodell et al. ................. | 342/29 |
| 3,025,514 | A | * | 3/1962 | Alexander et al. ............. | 342/29 |
| 3,528,070 | A | * | 9/1970 | Young, Jr. ....................... | 342/67 |
| 3,691,559 | A | * | 9/1972 | Jackson ......................... | 342/458 |
| 3,714,651 | A | * | 1/1973 | Lyon .............................. | 342/29 |
| 3,842,417 | A | * | 10/1974 | Williams ....................... | 342/158 |
| 4,188,630 | A | * | 2/1980 | Milosevic ....................... | 342/29 |
| 4,298,875 | A | * | 11/1981 | Sullivan ........................ | 342/455 |
| 4,317,119 | A | * | 2/1982 | Alvarez ......................... | 342/455 |
| 4,336,540 | A | * | 6/1982 | Goodwin et al. .............. | 342/157 |
| 4,403,220 | A | * | 9/1983 | Donovan ........................ | 342/29 |
| 4,646,244 | A | * | 2/1987 | Bateman et al. ............... | 701/301 |
| RE33,152 | E | * | 1/1990 | Atlas ............................. | 342/26 R |
| 4,963,888 | A | * | 10/1990 | Taylor et al. .................... | 342/90 |
| 5,157,615 | A | * | 10/1992 | Brodegard et al. ............ | 701/301 |
| 5,321,406 | A | * | 6/1994 | Bishop et al. .................. | 342/32 |
| 5,448,233 | A | * | 9/1995 | Saban et al. ................... | 340/963 |
| 5,581,250 | A | * | 12/1996 | Khvilivitzky ................. | 340/961 |
| 5,627,546 | A | * | 5/1997 | Crow ............................ | 342/352 |
| 5,774,088 | A | * | 6/1998 | Kreithen ......................... | 342/22 |
| 5,786,773 | A | * | 7/1998 | Murphy ......................... | 340/947 |
| 5,933,099 | A | * | 8/1999 | Mahon .......................... | 340/961 |
| 6,133,867 | A | * | 10/2000 | Eberwine et al. ............... | 342/29 |
| 6,208,284 | B1 | * | 3/2001 | Woodell et al. ................ | 342/30 |
| 6,211,808 | B1 | * | 4/2001 | Rees .............................. | 342/29 |
| 6,252,525 | B1 | * | 6/2001 | Philiben ........................ | 340/961 |
| 6,262,679 | B1 | * | 7/2001 | Tran .............................. | 342/29 |
| 6,433,729 | B1 | * | 8/2002 | Staggs ........................... | 342/29 |
| 6,538,581 | B2 | * | 3/2003 | Cowie ........................... | 340/961 |
| 6,804,607 | B1 | * | 10/2004 | Wood ............................. | 701/301 |
| 6,816,105 | B2 | * | 11/2004 | Winner et al. ................. | 342/37 |
| 6,873,269 | B2 | * | 3/2005 | Tran .............................. | 340/961 |
| 6,909,381 | B2 | * | 6/2005 | Kahn ............................ | 340/945 |
| 6,940,424 | B2 | * | 9/2005 | Philiben et al. ............... | 340/945 |
| 7,006,032 | B2 | * | 2/2006 | King et al. ..................... | 342/29 |
| RE39,053 | E | * | 4/2006 | Rees .............................. | 342/29 |
| 7,280,068 | B2 | * | 10/2007 | Lee et al. ...................... | 342/22 |

(Continued)

*Primary Examiner* — Jack W Keith
*Assistant Examiner* — Peter Bythrow

(57) ABSTRACT

A non-scanning radar system is installed on an aircraft to detect and avoid bird strikes or collisions with other airborne hazards. Target amplitude, range, and Doppler tracking versus time are used to qualify the collision threat. Avoidance is based on a quick minor altitude change by the pilot or autopilot to exit the imminent bird or other airborne hazard altitude window. In one embodiment, a bistatic passive radar receiver antenna is used in conjunction with an existing geostationary satellite signal. Range and Doppler information are obtained via cross correlation processing of the hazard reflection signal with a direct path reference signal from the satellite.

18 Claims, 8 Drawing Sheets

(56) References Cited

U.S. PATENT DOCUMENTS

| | | | |
|---|---|---|---|
| 7,307,579 B2 * | 12/2007 | Rees et al. | 342/29 |
| 7,349,774 B2 * | 3/2008 | Werback | 701/3 |
| 7,443,334 B2 * | 10/2008 | Rees et al. | 342/29 |
| 7,492,307 B2 * | 2/2009 | Coulmeau | 342/32 |
| 7,818,127 B1 * | 10/2010 | Duggan et al. | 701/301 |
| 7,864,096 B2 * | 1/2011 | Stayton et al. | 342/29 |
| 7,876,258 B2 * | 1/2011 | Abraham et al. | 342/29 |
| 7,948,404 B2 * | 5/2011 | Tran | 340/961 |
| 7,961,135 B2 * | 6/2011 | Smith et al. | 342/29 |
| 8,010,288 B2 * | 8/2011 | Bouchet et al. | 701/301 |
| 2001/0013836 A1 * | 8/2001 | Cowie | 340/961 |
| 2002/0080059 A1 * | 6/2002 | Tran | 342/29 |
| 2002/0133294 A1 * | 9/2002 | Farmakis et al. | 701/301 |
| 2003/0122701 A1 * | 7/2003 | Tran | 342/29 |
| 2004/0024528 A1 * | 2/2004 | Patera et al. | 701/301 |
| 2005/0024256 A1 * | 2/2005 | Ridderheim et al. | 342/29 |
| 2005/0109872 A1 * | 5/2005 | Voos et al. | 244/3.17 |
| 2006/0049980 A1 * | 3/2006 | Archer et al. | 342/179 |
| 2006/0097895 A1 * | 5/2006 | Reynolds et al. | 340/961 |
| 2006/0214832 A1 * | 9/2006 | Lee et al. | 342/22 |
| 2007/0252748 A1 * | 11/2007 | Rees et al. | 342/29 |

* cited by examiner

AIRCRAFT BIRD STRIKE AVOIDANCE METHOD AND APPARATUS

RELATED INVENTION

The present invention claims priority under 35 U.S.C. §119(e) to: "Aircraft Bird Strike Avoidance Method and Apparatus," Provisional U.S. Patent Application Ser. No. 61/205,697, filed 22 Jan. 2009, which is incorporated by reference herein.

TECHNICAL FIELD OF THE INVENTION

The present invention relates to the detection and avoidance of imminent aircraft collisions with birds or other airborne hazards such as other aircraft.

BACKGROUND OF THE INVENTION

Aviation experts say bird-plane collisions happen daily. Nearly 200 people have been killed or injured since 1990 in accidents involving aircraft and wildlife. It is estimated that bird strikes cost military and commercial aviation over $2 billion each year due to damage and other costs. Most birds fly below 5,000 ft. However, bird strikes have occurred at 17,000 ft. and a few sightings have been made above 20,000 ft. In general, birds fly higher at night and during the spring and fall migration periods. They also fly higher in the presence of complete cloud cover.

Airports take a variety of measures to reduce bird populations near major airports. In a few cases, ground based radars are used to detect flying birds near aircraft approach and departure paths. However, outside of these few major airports, no bird detection devices are currently available other than the pilot's see-and-avoid procedures.

It is possible to equip an aircraft with a specialized high resolution scanning radar to detect and display the presence of birds. However, such a radar would be expensive and it would be difficult to find antenna installation space even on the largest aircraft.

Accordingly, there is a need for small low cost aircraft based detection equipment that would alert the pilot to the possibility of an imminent collision with a bird or other airborne hazard.

SUMMARY OF THE INVENTION

In accordance with the present invention, bird strike collision avoidance techniques are presented which will alert the pilot to take evasive action to avoid colliding with birds or other imminent collision hazards such as other aircraft.

Briefly, to achieve the desired object of the present invention, two types of radars are presented. Both radars use a non-scanning narrow elevation fan beam to detect the presence of hazards in a short range altitude slice ahead of the aircraft. Target amplitude, range, and Doppler tracking versus time are used to qualify the collision threat. Avoidance is based on a quick minor altitude change by the pilot or autopilot to exit the imminent bird, small aircraft, or other airborne hazard altitude window.

To obtain a narrow elevation fan beam antenna pattern, a tall thin antenna is required. A natural place to mount such an antenna is on the forward facing surface of the aircraft vertical tail section.

In one embodiment of the invention, a traditional non-scanning radar system is used to illuminate the narrow elevation fan beam volume ahead of the aircraft.

In another embodiment, a bistatic passive radar receiver antenna is used in conjunction with an existing (or future) geostationary satellite signal. Radar target range, amplitude, and Doppler information are obtained via cross correlation processing of the airborne hazard reflection signal with a direct path reference signal from the satellite.

In another embodiment, an additional non-scanning narrow azimuth fan beam receive antenna is mounted near the nose of the aircraft or on the leading edge of one wing.

In another embodiment, an additional non-scanning narrow azimuth fan beam receive antenna is mounted on the leading edges of both wings.

Other objects and advantages of the present invention will become obvious as the preferred embodiments are described and discussed below.

DETAILED DESCRIPTION OF THE PREFERRED EMBODIMENTS

Figure 1:
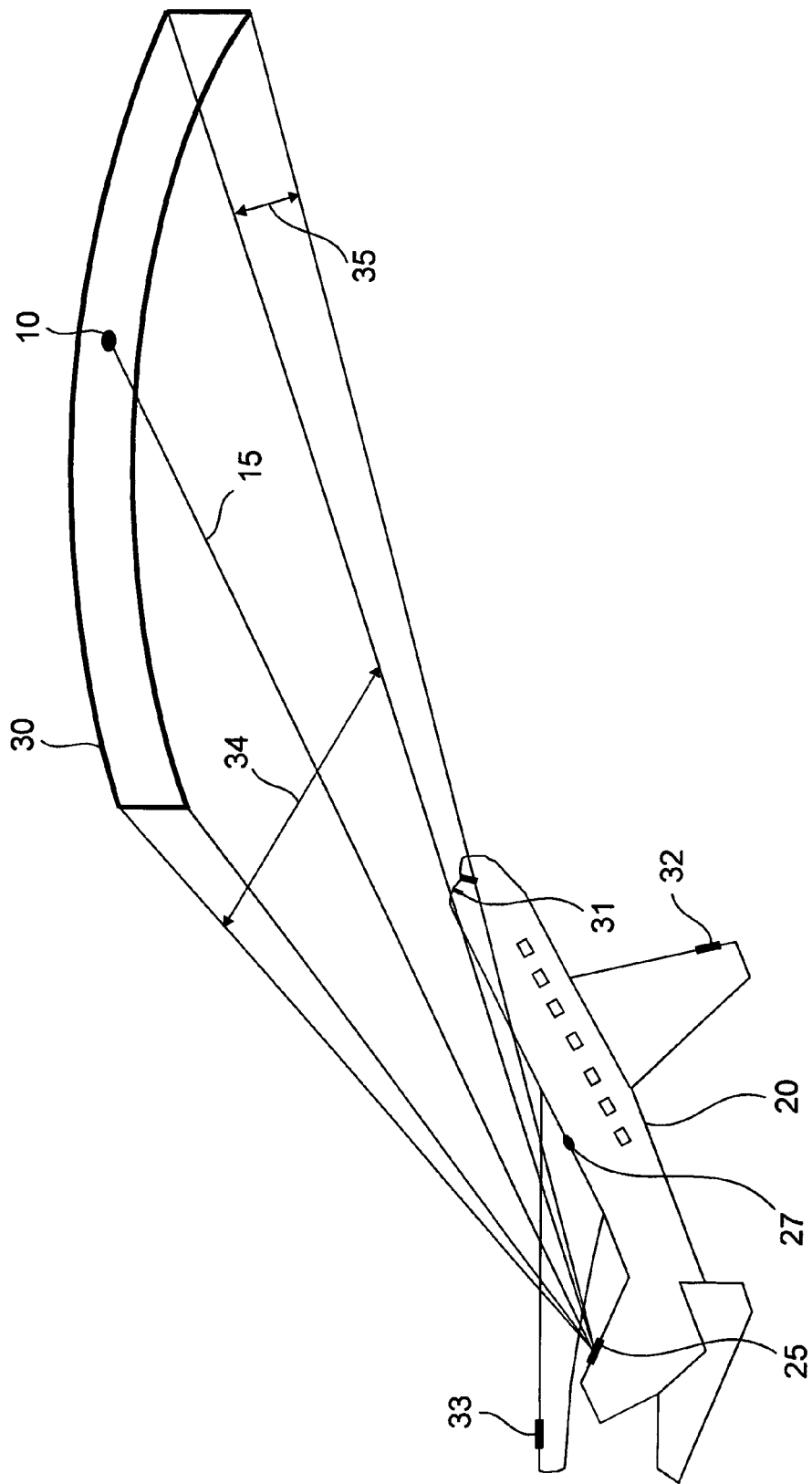
FIG. 1 illustrates an elevation fan beam antenna mounted on the vertical tail of an aircraft approaching an airborne hazard.

The basic problem and its solution using the present invention is illustrated in FIG. 1. FIG. 1 illustrates a target 10 at range 15 in the flight path of aircraft 20. Vertical tail mounted narrow elevation fan beam antenna 25 monitors radar reflection signals within the design surveillance volume of fan beam 30 of antenna 25. Reference antenna 27, when required, is mounted somewhere along the top surface of aircraft 20.

Azimuth angle 34 and elevation angle 35 of fan beam 30, along with maximum processing range, are selected based on the required bird strike threat surveillance volume and alert latencies. Signals beyond the maximum processing range are rejected in the radar signal detection processor 270 illustrated in FIG. 6 and FIG. 7.

Maximum processing range can be varied based on aircraft speed and altitude. At low altitudes, the processing range can be restricted to avoid antenna 25 sidelobe ground reflections from being confused as possible bird reflections. Lower speeds also allow maximum processing range reductions without reducing alert latency.

Figure 2:
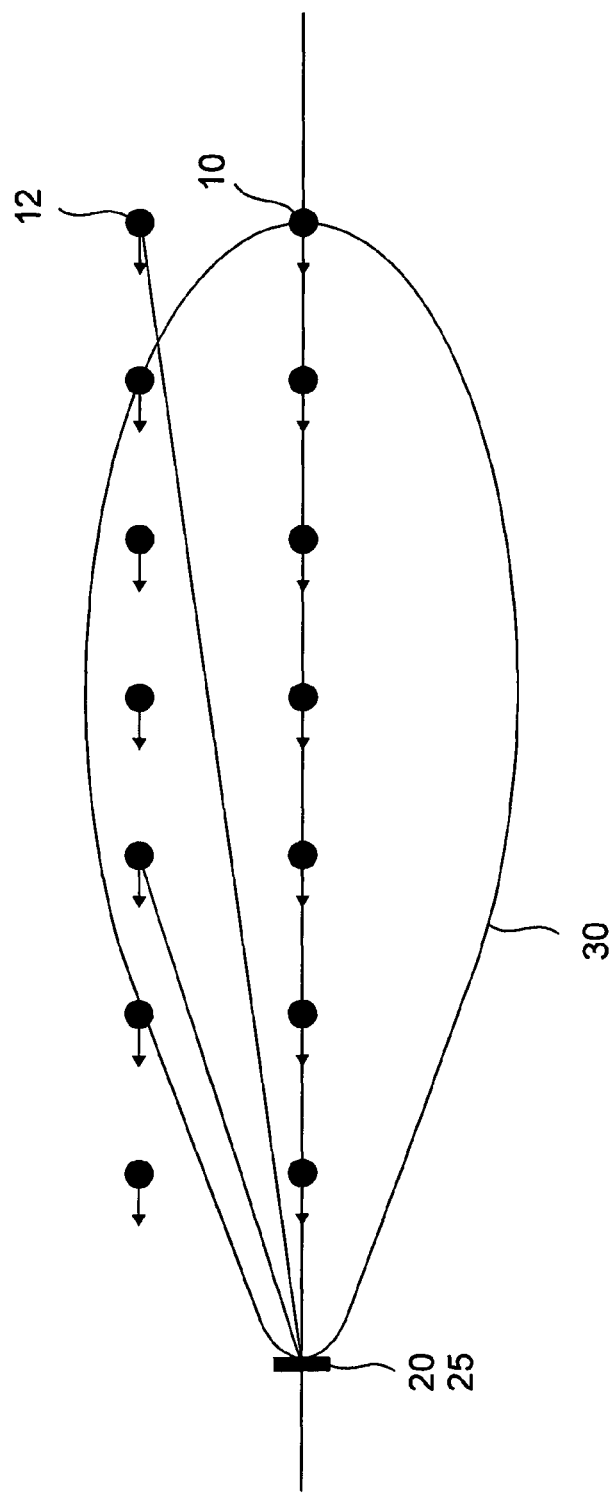
FIG. 2 illustrates the elevation cross section of the elevation fan beam antenna pattern and radar targets on and off antenna boresight.

In a scanning radar, the target parameters of range, elevation, azimuth, amplitude, and Doppler shift are available for target threat assessment. In non-scanning radar, only target range, amplitude, and Doppler shift are available. FIG. 2 illustrates how the variation of these parameters as the aircraft closes with the target will be used by target processor 275 in FIG. 6 and FIG. 7 for threat assessment.

FIG. 2 illustrates target 10 along antenna 25 boresight (antenna maximum directivity) and target 12 offset from boresight in either azimuth, elevation, or both. As target 10 closes with aircraft 20, its Doppler offset frequency and normalized amplitude remains constant. Normalized amplitude is defined here as the target amplitude compensated for range (range sensitivity time control).

In contrast, as target 12 closes with aircraft 20, both its normalized amplitude and Doppler offset frequency decrease with range. The normalized amplitude decreases because the antenna gain decreases as the target's angular position off boresight increases. The target can actually disappear at close range as it exits the coverage volume of fan beam 30. The Doppler shift decreases because the target radial velocity, directly towards the antenna, decreases and goes to zero as the target becomes perpendicular to the antenna.

This variation of normalized amplitude and Doppler frequency shift, as the aircraft approaches the target, is used to determine the collision threat probability. If the normalized amplitude and Doppler frequency offset are nearly constant as the aircraft approaches the target, the collision threat probability is high. If the normalized amplitude and Doppler offset decrease rapidly, the collision threat probability is low. When the collision threat probability exceeds a predetermined threshold, target processor 275 in FIG. 6 and FIG. 7 will alert the pilot to make a small altitude maneuver to avoid a collision.

Using a traditional radar, fan beam antenna 25 both transmits the radar signal and receives target reflections. Using a bistatic radar, fan beam antenna 25 is receive only. The bistatic radar transmitter and antenna are located at a distant location.

Figure 3:
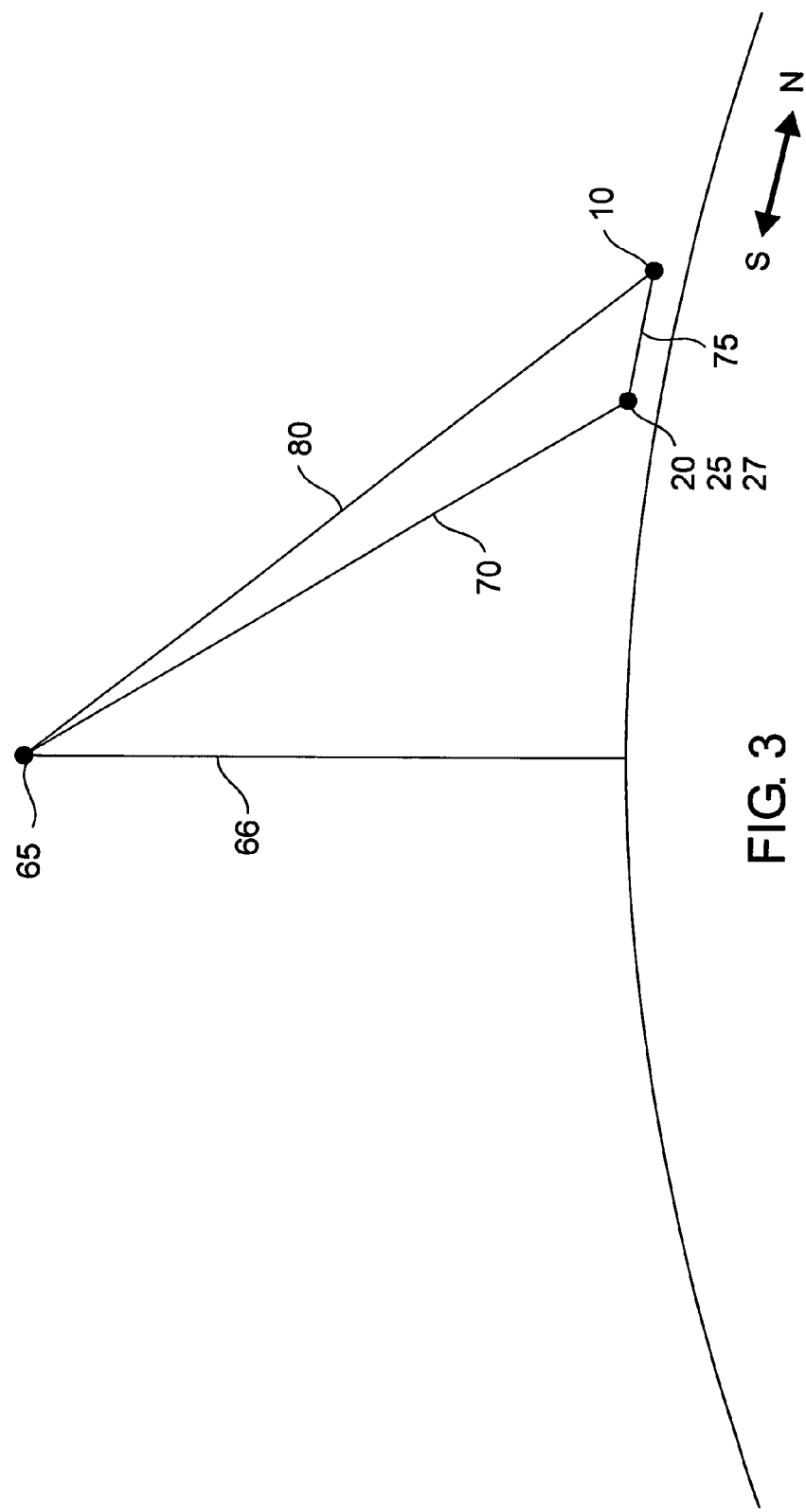
FIG. 3 illustrates a positional sketch of a geostationary satellite 65, an aircraft 20, and an airborne hazard 10.

FIG. 3 is an exaggerated illustration of a bistatic radar where the transmitter is placed on geostationary satellite 65 at a height 66 of 22,236 miles above the equator and target 10 is primarily north of aircraft 20. The geostationary satellite 65 signal is received by aircraft 20 via signal path 70 using top mounted reference antenna 27. Target 10 is illuminated by geostationary satellite 65 signal via signal path 80. The target reflected signal is received by aircraft 20 via signal path 75 using tail mounted fan beam antenna 25. These reference and reflected signals are coherently cross correlated to obtain the aircraft-to-target range, amplitude, and Doppler shift values.

Figure 4:
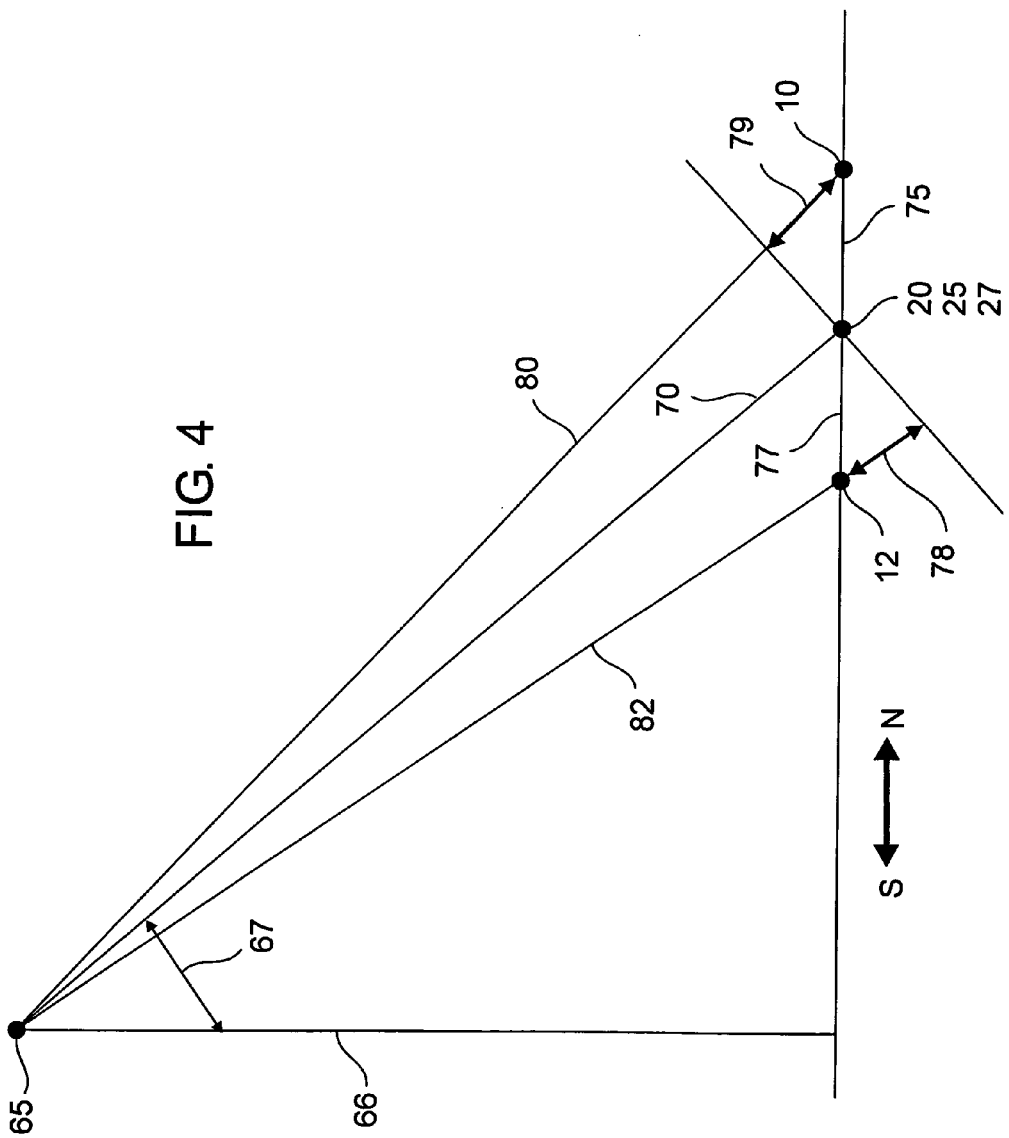
FIG. 4 illustrates a signal path length sketch between geostationary satellite 65, aircraft 20, and airborne hazard 10.

Using aircraft GPS information, aircraft-to-target range and Doppler shift information can be accurately determined from the known positions of geostationary satellite 65 and aircraft 20. However, to a first approximation, a simple lookup table can be used to compensate cross correlated aircraft-to-target range and Doppler measurements for the geostationary satellite 65 signal path length differences between aircraft 20 and target 10 using the flat earth geometry illustrated in FIG. 4.

The elevation angle 67 to geostationary satellite 65 is equal to the latitude position of aircraft 20 which varies from around 30 degrees at the southern US border to 49 degrees at the northern US border. When target 10 is directly north of aircraft 20, the cross correlated measured aircraft-to-target signal path 75 increases by the amount that signal path 80 is longer 79 than signal path 70. Likewise, when target 12 is directly south of aircraft 20, the cross correlated measured aircraft-to-target signal path 77 decreases by the amount that signal path 82 is shorter 78 than signal path 70. The lookup table range parameter compensation is a simple cosine function of heading (north equal to 0 degrees) whose peak amplitude is based on the latitude of aircraft 20.

No compensation is required when target 10 is directly east or west of aircraft 20 since path lengths 70, 80, and 82 are equal. That is, the cross correlated measured distances 75 or 77 are equal to the actual physical aircraft-to-target distances.

Only the Doppler variation with range is important for threat assessment. Except for aircraft or targets in a tight turn, the geostationary satellite Doppler shift should not change during the threat observation time. Therefore, cross correlation Doppler shift variation is still primarily a function of the aircraft-to-target closure geometry as was illustrated in FIG. 2.

Radar detection is a very mature field with many choices available for frequency, transmit power, and waveform design. Both pulsed and CW waveforms can be used as is well known by anyone skilled in the art.

The present invention radar should be looking at empty space, free of targets, until a collision hazard appears. Therefore, its primary task is target detection. Any short range reflected energy is a potential cause for pilot concern. Target position detection is of secondary importance, but is required to determine the collision threat probability because statistically most small targets will harmlessly pass by the aircraft without actually colliding with the aircraft.

Radar detection is a function of transmit energy, irrespective of the transmit signal waveform design. However, range resolution and Doppler resolution are determined by the actual waveform design as illustrated in FIG. 5.

Figure 5:
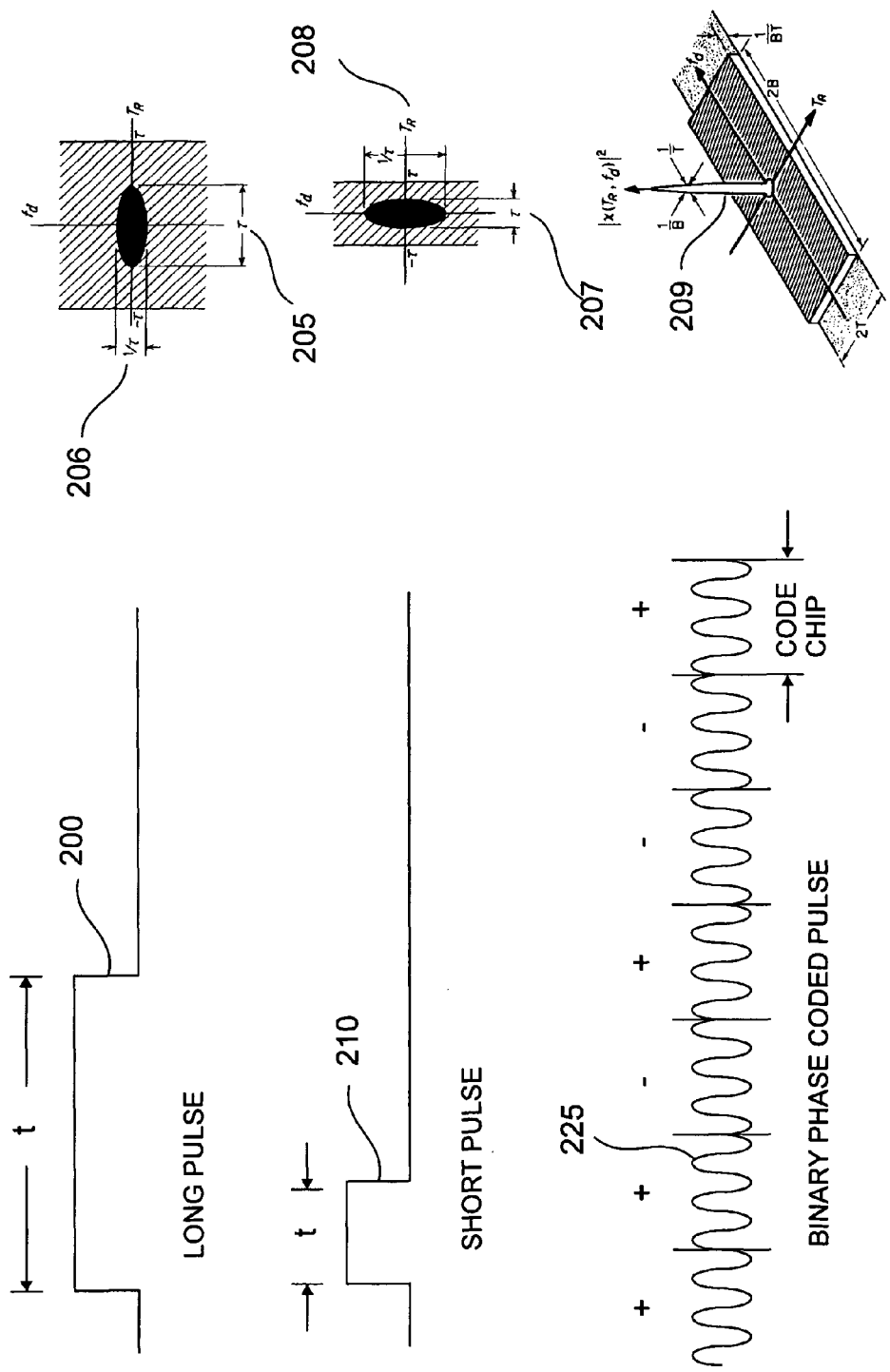
FIG. 5 illustrates the radar signal ambiguity function for various radar signals.

FIG. 5 illustrates the ambiguity function of common radar waveforms. Range and Doppler resolution are defined by the radar signal ambiguity function which is simply the cross correlation between the transmit pulse and its range and Doppler shifted versions as is well known by those skilled in the art.

Long pulse 200 is characterized by low range resolution 205 and high Doppler resolution 206. Short pulse 210 is characterized by high range resolution 207 and low Doppler resolution 208. Pseudo random noise (PN) coded pulse compression waveform 225 has both high range and Doppler resolution as illustrated by thumbtack response 209.

Figure 6:
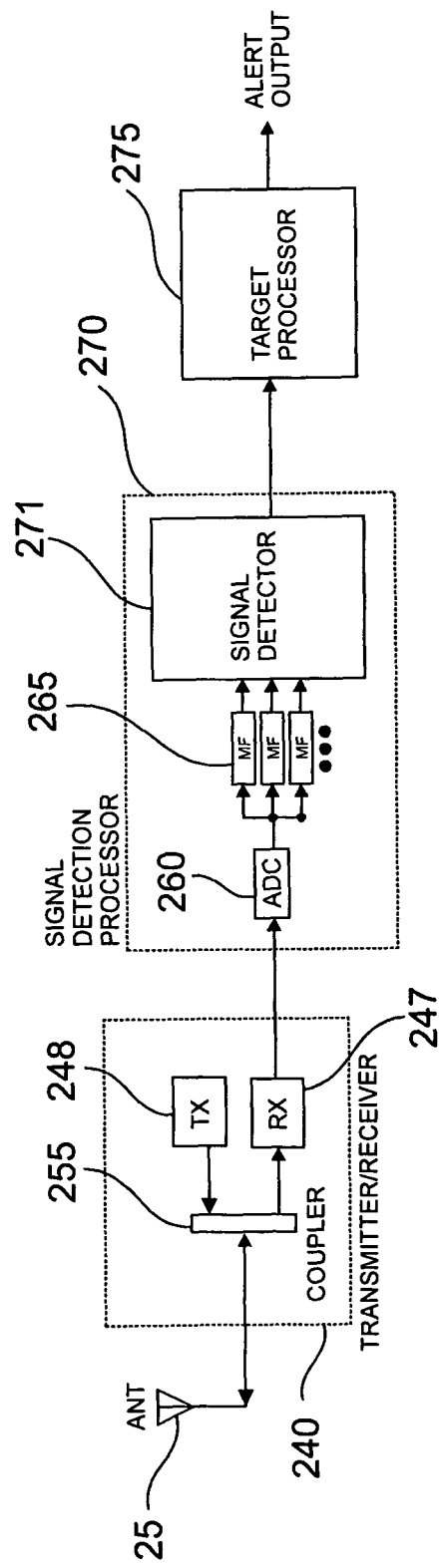
FIG. 6 illustrates a block diagram of a traditional transmit/receive radar system.

Although pulse type radars can be used in the present invention, a more appropriate radar for this application is a CW radar using a PN coded pulse compression waveform 225. A CW radar does not have the close range reception dead zone caused by transmit pulse blanking required in pulse type radars. A block diagram of a CW radar's preferred implementation is illustrated in FIG. 6 for a traditional radar and in FIG. 7 for a bistatic radar.

Transmitter/receiver section 240 couples transmitter 248 and receiver 247 to common antenna 25 using coupler 255. These elements are placed close to antenna 25 to minimize RF signal losses.

Signal detection processor 270 digitizes radar reflection signals using analog to digital converter (ADC) 260, cross correlates the transmit and received signals using Doppler bank of matched filters 265, and quantizes their amplitude, range, and Doppler shift using signal detector 271. Target processor 275 applies the threat algorithm to the varying range, amplitude, and Doppler shift values of the detected signals to determine collision threat probability. When a high probability collision threat is detected, an alert is issued to the pilot or a command is issued to the autopilot to commence an evasive maneuver. Slight altitude changes should be sufficient to exit the target collision threat window.

Figure 7:
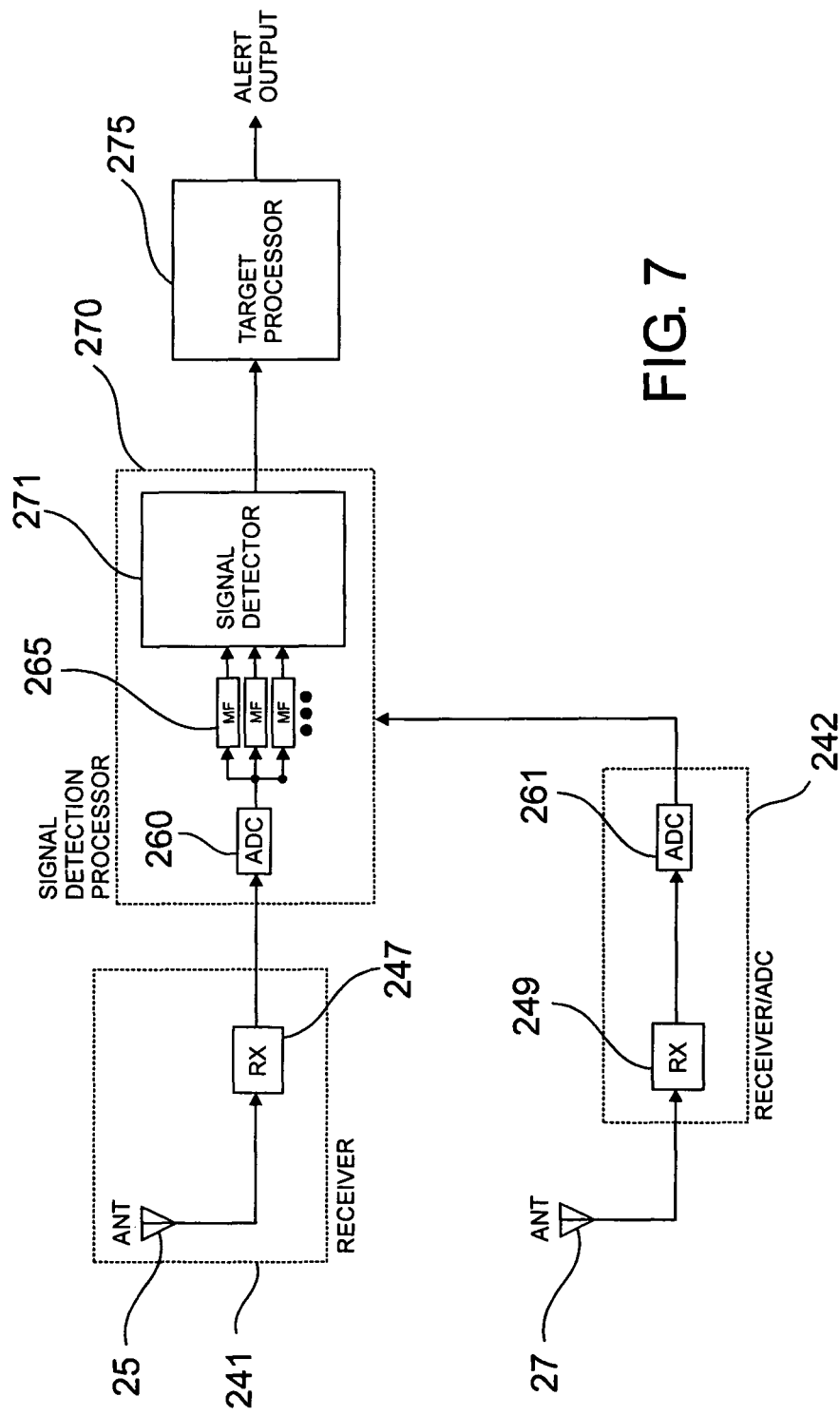
FIG. 7 illustrates a block diagram of a bistatic passive receive-only radar system.

For the bistatic radar, reference antenna 27, receiver 249, and ADC 261 are added as illustrated in FIG. 7. The signals from antennas 25 and 27 are cross correlated in signal detection processor 270. Target processor 275 alert outputs will be passed to existing aircraft aural, display, or autopilot resources using any appropriate interface method. For very light aircraft, any appropriate means of alerting the pilot can be implemented as is well known to those skilled in the art.

The use of a bank of Doppler matched filters is based on the assumption that the cross correlated radar signal will approximate a thumbtack ambiguity function, which provides high Doppler resolution, and therefore requires the cross correlated signals to be matched in Doppler offset.

The selection of transmit power, waveform design, and all radar hardware implementation tradeoffs are well known by practicing radar engineers for both traditional and bistatic radars. The radar cross section for a large variety of birds at different frequencies and aspect angles are available in the literature. The nominal radar cross section of a pigeon is 0.01 square meters.

Ideally, the FAA or other government entity could provide an optimally designed geostationary satellite signal to be used for the bistatic radar implementation of the present invention. The bistatic radar implementation lowers the aircraft equipment cost and complexity for all users within the geostationary satellite service coverage, with respect to a traditional radar implementation, since no aircraft transmitter is required. However, an existing geostationary satellite signal can also be used.

One of the most powerful geostationary satellites available is used for XM satellite radio. XM broadcasts a 4 MHz wide signal with a 98 dBm EIRP at a downlink center frequency of 2334.5 MHz. The processing gain of cross correlating a 4 MHz bandwidth signal using a 1 Hz and 10 Hz integration bandwidth is 66 dB and 56 dB respectively. Reflected target energy will increase or decrease by 6 dB for each dividing or doubling respectively of aircraft-to-target range. In contrast, it increases or decreases by 12 dB for a traditional radar. For both a traditional and bistatic radar, reflected target energy will increase by about 10 dB if the target is a flock of birds and by about 20 dB if the target is a small aircraft.

At an aircraft speed of 200 knots, this bistatic radar can provide approximately 10 seconds warning of an imminent collision with a flock of birds. Thus, the XM satellite signal power is adequate for use as a bistatic radar transmitter in the present invention.

It is important to note that the XM 4 MHz bandwidth signal does not have to be demodulated. Instead, this signal functions as a noise radar signal. In noise radar, a random noise source is used as the transmit signal. It has a thumbtack ambiguity function similar to a PN coded pulse compression waveform. Since the XM signal is composed of many random data subcarriers (music channels), the composite XM signal is essentially random noise before demodulation.

There are many other geostationary satellites available to choose from whose frequencies range from L-Band to Ka-Band. Most communication satellites contain 24 C-band and 24 to 36 Ku-band transponder channels of which half are vertically polarized and half are horizontally polarized. The bandwidth of each C-band Fixed Satellite Services (FSS) transponder channel is 36 MHz. The bandwidth of each Ku-band Broadcasting Satellite Services (BSS) transponder channel is 27 MHz.

In general, these other choices have lower power densities and wider bandwidths which makes signal cross correlation more difficult than using the XM signal. However, higher frequencies allow smaller and higher gain antennas to be used on the aircraft. Cross correlation can be performed for each individual transponder channel or for the entire satellite bandwidth. To obtain an even higher bistatic radar transmit power, the signal from multiple adjacent satellites could also be used.

Frequency reuse via geostationary satellite spacing typically requires that reference antenna 27 be steered towards the satellite being used. Such antennas are currently available for direct broadcast TV, Satcom, and other communication applications on various aircraft. XM has the advantage that it is a protected frequency designed to be received using a small low gain antenna with nearly hemispherical coverage. One option might be to use an existing or modified aircraft communication antenna, such as for Mode S, or other currently installed antenna for XM signal reference antenna 27.

Detection sensitivity (peak of the ambiguity function) of cross correlated geostationary satellite signals can be increased by increasing the cross correlation integration time.

The shape of the ambiguity function is determined by the geostationary satellite's signal characteristics but should have a sharp peak and low sidelobes similar to the ambiguity function of PN coded signals due to their randomness.

Mounting additional antennas on the aircraft may be desirable in some implementations. For example, a non-scanning long narrow horizontal mounted receive antenna 31 illustrated in FIG. 1, which will have a narrow azimuth and wide elevation beamwidth, can be mounted near the nose of the aircraft or on the leading edge of a wing. This also requires the addition of another receiver/ADC section 242 as was illustrated in FIG. 7 for reference antenna 27. The purpose of this new implementation is to create two receive beams whose overlapping surveillance volume only includes the collision threat area. Target processor 275 would issue an alert whenever a target at similar ranges was simultaneously detected within the overlapping surveillance volume of both antennas. This implementation reduces the radar processing complexity since it alerts on any targets detected at similar range within the overlapping antenna beamwidths, but this implementation also requires an additional antenna and receiver/ADC section.

Figure 8:
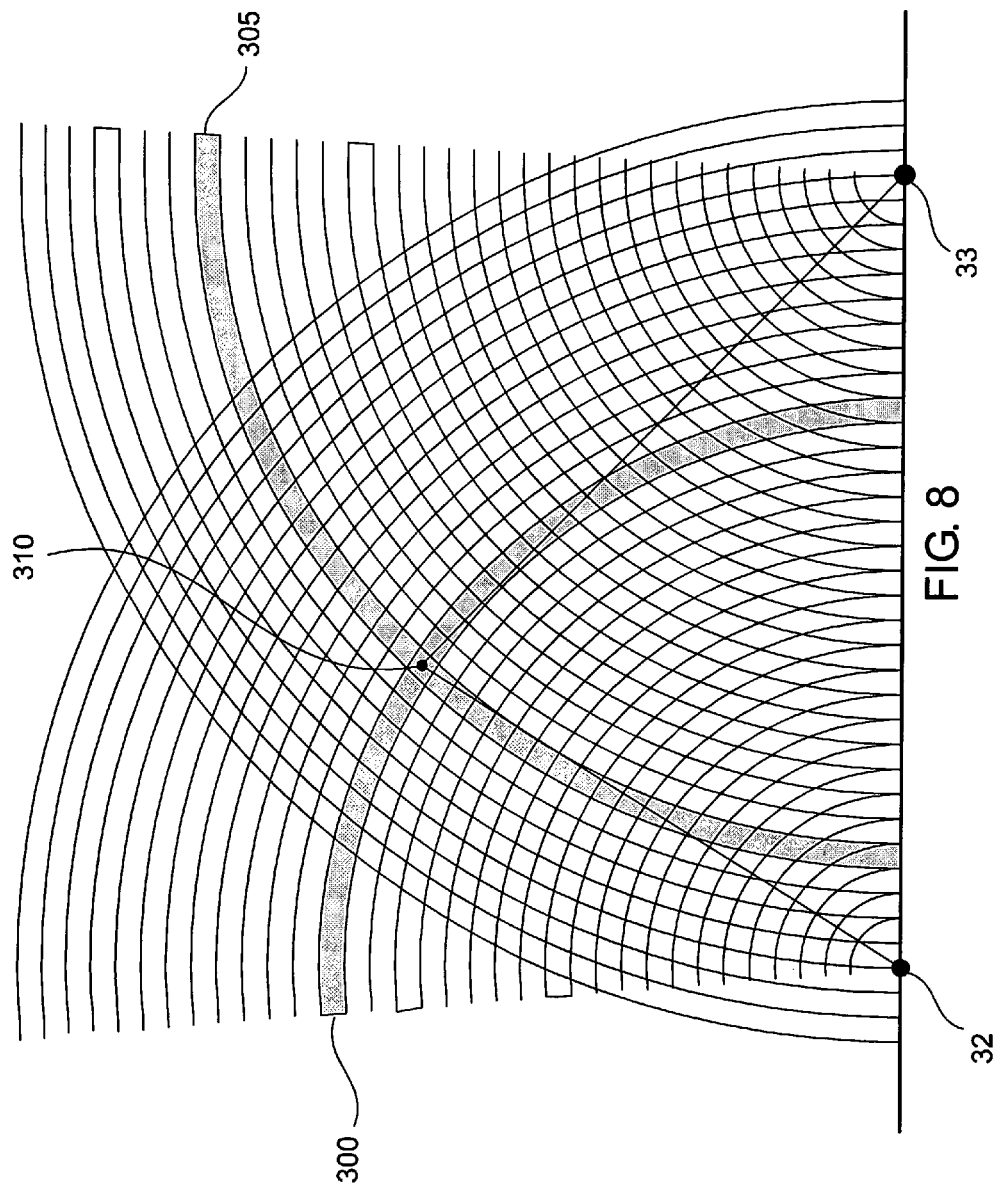
FIG. 8 illustrates target triangulation using two receive antennas.

As another example, non-scanning narrow horizontal mounted receive antennas 32 and 33 can be mounted on the leading surface near the wingtips of both wings as illustrated in FIG. 1. Two additional receiver/ADC sections 242 are also required. In this implementation, the range and azimuth positions of target 310 are determined by triangulation of range ring 300 of antenna 32 and range ring 305 of antenna 33 as illustrated in FIG. 8. Using this implementation, the pilot can be given the threat direction via voice alerts, aircraft panel display, or heads-up windscreen indicator.

XM currently has two geostationary satellites parked at 85 and 115 degrees west longitude for spatial/frequency/time diversity. Both satellites can be used simultaneously to form a composite radar signal since their transmission frequencies are unique. Multiple geostationary satellites can also be used simultaneously. Likewise, multiple transmitters can be mounted on the aircraft and their signals transmitted through a single or multiple antennas.

The primary purpose of each of these implementations is to alert the pilot of imminent collision hazards after leaving the airport. During takeoff and landing, most aircraft cannot execute abrupt maneuvers to avoid bird strikes. Instead, the airport must take steps to minimize the presence of birds near the runways or delay takeoffs and landings until birds have moved a safe distance from the runways.

Although the preferred embodiments of the invention have been illustrated and described in detail, it will be readily apparent to those skilled in the art that various modifications may be made therein without departing from the spirit of the invention.

For example, separate co-located antennas (monostatic radar) can be used in FIG. 6 in place of antenna 25 and coupler 255 to increase the transmit-to-receive isolation of a CW radar. Alternatively, antenna 25 could be used for transmit and antenna 31 for receiving. Or, both receiving antennas 32 and 33 could be used to provide azimuth triangulation.

Antenna locations other than those illustrated may be more appropriate. By using a very high transmit frequency, it may be possible to find adequate space to mount a large enough single circular or conformal patch antenna to simultaneously obtain both the desired elevation and azimuth beamwidths.

It is also possible to use the bistatic radar technique with existing terrestrial transmitters such as TV stations or with specially constructed transmitters, but service would be very local. However, a high frequency beacon directed along airport approach and departure routes might make sense with the present invention.

The concept of using a geostationary satellite signal as a bistatic radar transmit signal is not limited to aircraft collision hazard avoidance applications. This invention can also be used for open area terrestrial intrusion detection applications. With both the geostationary satellite transmitter and the ground receiving antenna stationary, Doppler filtering can be used to detect any moving objects. Two or more receiving antennas can be used to indicate the position, direction, and track of the movement.

Many other simple modifications are also possible without departing from the spirit of the invention.

What is claimed is:

1. A method for detecting and avoiding an aircraft collision with birds, said method comprising:
   providing at least one non-scanning antenna on said aircraft;
   illuminating a surveillance volume ahead of said aircraft with a radar signal;
   receiving reflections of said radar signal from radar targets at least as small as birds in said surveillance volume, said receiving operation being performed by the same or a different one of said at least one non-scanning antenna on said aircraft;
   measuring target parameters of said radar targets, said target parameters include at least range, amplitude, and Doppler shift of each said radar targets;
   determining the collision threat probability of said aircraft with said radar targets, said collision threat probability determined by the variation of said target parameters with time;
   alerting the pilot of a collision threat when said collision threat probability exceeds a predetermined threshold; and
   maneuvering said aircraft to avoid colliding with said birds when alerted of said collision threat, said maneuvering operation being performed by said pilot or an aircraft autopilot.

2. A method as claimed in claim 1 wherein said collision threat probability exceeds said predetermined threshold when a target normalized said amplitude is nearly constant as said range to said target decreases.

3. A method as claimed in claim 1 wherein said collision threat probability exceeds said predetermined threshold when a target said Doppler shift is nearly constant as said range to said target decreases.

4. A method as claimed in claim 1 wherein said radar signal is transmitted and said reflections are received using the same or different said non-scanning antenna on said aircraft.

5. A method as claimed in claim 1 wherein said radar signal is transmitted from a geostationary satellite and said reflections are received using at least one said non-scanning antenna on said aircraft.

6. A method as claimed in claim 5 wherein said geostationary satellite is at least one XM satellite radio geostationary satellite.

7. A method as claimed in claim 5 wherein said geostationary satellite is at least one Fixed Satellite Services or Broadcasting Satellite Services geostationary communications satellite.

8. A method as claimed in claim 5 wherein said radar signal is an existing broadcast signal from said geostationary satellite.

9. A method as claimed in claim 1 wherein said radar signal is a continuous wave pseudo random noise coded pulse compression waveform.

10. A method as claimed in claim 1 further including receiving a non-reflected said radar signal and cross correlating said non-reflected radar signal with a reflected said radar signal from a target to measure said target parameters.

11. A method as claimed in claim 1 further including separating a pair of said non-scanning antenna on said aircraft horizontally or vertically and determining said collision threat probability of said radar targets by triangulation.

12. An apparatus for detecting and avoiding an aircraft collision with birds, said apparatus comprising:
   one or more non-scanning antennas mounted on said aircraft and configured to observe an airborne surveillance volume ahead of said aircraft;
   a transmitter configured to illuminate said surveillance volume with a radar signal;
   receivers coupled to each said antennas and configured to receive reflections of said radar signal from radar targets at least as small as birds;
   a signal detection processor coupled to said receivers and configured to detect and process said reflections from said radar targets;
   a target processor coupled to said signal detection processor and configured to determine if said radar targets represents a collision threat between said aircraft and said birds; and
   means for communicating said collision threat to said aircraft pilot or said aircraft autopilot,
   whereby said pilot or said autopilot can maneuver said aircraft to avoid a collision with said birds.

13. An apparatus as in claim 12 wherein said signal detection processor includes a plurality of filters matched to different Doppler offset frequencies of said reflections of said radar signal from said radar targets.

14. An apparatus as in claim 12 wherein said signal detection processor includes a signal detector configured to measure target parameters of said radar targets, said target parameters include at least range, amplitude, and Doppler shift of each said radar targets.

15. An apparatus as in claim 12 wherein a target is determined to be said collision threat when the normalized said target amplitude is essentially constant as said target range to said target decreases.

16. An apparatus as in claim 12 wherein a target is determined to be said collision threat when said target Doppler shift is essentially constant as said target range to said target decreases.

17. An apparatus as in claim 12 wherein said transmitter is located on a geostationary satellite.

18. An apparatus as in claim 17 wherein said radar signal is said geostationary satellite existing broadcast signal.

* * * * *